United States Patent
Waddell et al.

(10) Patent No.: US 7,451,529 B2
(45) Date of Patent: *Nov. 18, 2008

(54) COLORABLE ELASTOMERIC COMPOSITION

(75) Inventors: Walter H. Waddell, Pasadena, TX (US); Robert R. Poulter, League City, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/053,250

(22) Filed: Feb. 8, 2005

(65) Prior Publication Data

US 2005/0137339 A1 Jun. 23, 2005

Related U.S. Application Data

(62) Division of application No. 10/398,270, filed as application No. PCT/US01/32232 on Oct. 16, 2001, now Pat. No. 6,939,921.

(51) Int. Cl.
C08K 5/04 (2006.01)

(52) U.S. Cl. .......................... 24/394; 524/399; 524/400; 524/426; 524/430; 524/431; 524/432; 524/433; 524/575

(58) Field of Classification Search ................ 525/241, 525/232, 236, 237, 333.3, 333.4, 332.1, 333.1, 525/331.9, 332.5, 332.7, 333.8, 492; 524/474, 524/575, 551, 490, 394, 399, 400, 426, 430, 524/431, 432, 433

See application file for complete search history.

(56) References Cited

U.S. PATENT DOCUMENTS

| | | | |
|---|---|---|---|
| 2,631,984 A | 3/1953 | Crawford et al. ................ 260/5 |
| 3,099,644 A | 7/1963 | Parker et al. ................ 260/85.3 |
| 3,813,351 A | 5/1974 | Thomson et al. |
| 3,898,253 A | 8/1975 | Buckler et al. ............ 260/42.47 |
| 3,981,342 A | 9/1976 | Farber et al. ................. 152/347 |
| 4,057,090 A | 11/1977 | Hoshikawa et al. .......... 152/347 |
| 4,090,546 A | 5/1978 | Honda et al. ................. 152/347 |
| 4,210,187 A | 7/1980 | Egan ........................... 152/504 |
| 4,238,383 A * | 12/1980 | Anderson .................... 524/526 |
| 4,279,284 A * | 7/1981 | Spadone ...................... 152/511 |
| 4,395,506 A | 7/1983 | Nagano et al. ................. 524/68 |
| 4,502,520 A | 3/1985 | Sandstrom .............. 152/330 R |
| 4,616,686 A | 10/1986 | Berta .......................... 152/510 |
| 4,632,963 A | 12/1986 | Gardner et al. ............ 525/332.3 |
| 4,681,921 A | 7/1987 | Gardner et al. .............. 525/357 |
| 4,703,091 A | 10/1987 | Gardner et al. ........... 525/332.3 |
| 4,754,793 A | 7/1988 | Mohammed ................ 152/510 |
| 4,833,192 A * | 5/1989 | Lakshmanan et al. ....... 524/476 |
| 4,919,183 A | 4/1990 | Dobson ....................... 152/502 |
| 4,978,714 A | 12/1990 | Bayan et al. .................. 525/69 |
| 5,005,625 A | 4/1991 | Klemmensen et al. ....... 152/510 |
| 5,013,793 A | 5/1991 | Wang et al. .................. 525/195 |
| 5,071,913 A | 12/1991 | Powers et al. ................. 525/87 |
| 5,120,379 A | 6/1992 | Noda et al. ................... 156/107 |
| 5,156,921 A | 10/1992 | Lin et al. |
| 5,162,409 A | 11/1992 | Mroczkowski .............. 524/262 |
| 5,162,445 A | 11/1992 | Powers et al. ............. 525/333.4 |
| 5,178,702 A | 1/1993 | Frerking, Jr. et al. ........ 152/510 |
| 5,182,333 A | 1/1993 | Powers et al. ............... 525/315 |
| 5,194,455 A * | 3/1993 | Massow et al. ............. 522/152 |
| 5,234,987 A | 8/1993 | Hubbard et al. ............. 524/505 |
| 5,242,727 A | 9/1993 | Briddell et al. ............... 428/42 |
| 5,246,778 A * | 9/1993 | Costemalle et al. ......... 428/398 |
| 5,286,804 A | 2/1994 | Powers et al. ............. 525/333.4 |
| 5,334,321 A * | 8/1994 | Harrison et al. ............. 508/291 |
| 5,397,832 A * | 3/1995 | Ellul .......................... 524/515 |
| 5,491,196 A | 2/1996 | Beers et al. .................. 525/237 |
| 5,508,334 A * | 4/1996 | Chen .......................... 524/474 |
| 5,576,372 A | 11/1996 | Kresge et al. ............... 524/442 |
| 5,576,373 A | 11/1996 | Kresge et al. ............... 524/445 |
| 5,580,513 A | 12/1996 | Patitsas ....................... 264/501 |
| 5,621,045 A | 4/1997 | Patel et al. ................... 525/237 |
| 5,631,316 A | 5/1997 | Costemalle et al. ......... 524/521 |
| 5,656,694 A * | 8/1997 | Frechet et al. .............. 525/195 |
| 5,665,183 A | 9/1997 | Kresge et al. ............... 152/204 |
| 5,670,577 A | 9/1997 | Dawson, Jr. ................. 525/95 |
| 5,698,640 A | 12/1997 | Duvdevani et al. ....... 525/333.4 |
| 5,733,621 A | 3/1998 | Cotsakis et al. ............ 428/42.3 |
| 5,755,899 A | 5/1998 | Hecker et al. ............... 152/510 |

(Continued)

FOREIGN PATENT DOCUMENTS

DE 1 242 116 6/1967

(Continued)

OTHER PUBLICATIONS

JP Abstract for JO-3028-244-A, Publication date of Feb. 6, 1991.

(Continued)

Primary Examiner—Bernard Lipman

(57) ABSTRACT

Transparent and colorable elastomeric compositions are provided. The transparent elastomeric compositions can be covulcanized with rubbers such as polybutadiene, polyisoprene, styrene-butadiene rubber, styrene-isoprene-butadiene rubber, isoprene-butadiene rubber, or natural rubber and polybutene processing oil. The colorable rubber compositions have sufficient properties to function as a reinforcing member in a shoe sole or automobile tire. Preferably, both the transparent and colorable elastomeric compositions include at least one copolymer of a $C_4$ to $C_7$ isoolefin and a p-methylstyrene, silica and a high cis-polybutadiene rubber.

27 Claims, No Drawings

U.S. PATENT DOCUMENTS

| | | | |
|---|---|---|---|
| 5,807,629 A | 9/1998 | Elspass et al. | 428/323 |
| 5,859,114 A | 1/1999 | Davis et al. | 524/490 |
| 5,883,173 A | 3/1999 | Elspass et al. | 524/446 |
| 5,912,302 A * | 6/1999 | Gadkari et al. | 525/127 |
| 5,916,959 A * | 6/1999 | Lindquist et al. | 524/505 |
| 5,922,153 A | 7/1999 | Beers et al. | 152/510 |
| 5,925,702 A | 7/1999 | Hecker et al. | 524/449 |
| 5,936,023 A | 8/1999 | Kato et al. | 524/445 |
| 5,959,049 A | 9/1999 | Powers et al. | 526/185 |
| 5,964,969 A * | 10/1999 | Sandstrom et al. | 152/524 |
| 5,973,053 A | 10/1999 | Usuki et al. | 524/445 |
| 6,014,998 A | 1/2000 | Mowdood et al. | 152/564 |
| 6,034,164 A | 3/2000 | Elspass et al. | 524/445 |
| 6,060,549 A | 5/2000 | Li et al. | 524/445 |
| 6,084,031 A * | 7/2000 | Medsker et al. | 525/192 |
| 6,103,817 A | 8/2000 | Usuki et al. | 524/574 |
| 6,106,941 A * | 8/2000 | Fisher et al. | 428/355 EN |
| 6,207,764 B1 * | 3/2001 | Ignatz-Hoover | 525/332.6 |
| 6,228,978 B1 | 5/2001 | Agarwal et al. | 528/363 |
| 6,255,389 B1 | 7/2001 | Ouhadi et al. | 525/76 |
| 6,303,694 B1 * | 10/2001 | Hogan et al. | 525/192 |
| 6,323,433 B1 | 11/2001 | Mahaney et al. | 174/152 G |
| 6,326,426 B1 | 12/2001 | Ellul | 524/270 |
| 6,374,889 B1 * | 4/2002 | McElrath et al. | 152/525 |
| 6,710,116 B1 * | 3/2004 | Waddell et al. | 524/515 |
| 6,730,739 B2 * | 5/2004 | Gipson | 525/191 |
| 6,765,045 B1 * | 7/2004 | Daniel et al. | 524/237 |
| 6,939,921 B2 * | 9/2005 | Waddell et al. | 525/241 |
| 2004/0030036 A1 | 2/2004 | Waddell et al. | 524/567 |

FOREIGN PATENT DOCUMENTS

| | | |
|---|---|---|
| EP | 0 102 844 A2 | 3/1984 |
| EP | 0 127 998 A2 | 12/1984 |
| EP | 0 296 332 B1 | 12/1988 |
| EP | 0 314 416 A2 | 5/1989 |
| EP | 0 320 263 B1 | 6/1989 |
| EP | 0 376 558 B1 | 7/1990 |
| EP | 0 682 071 | 7/1997 |
| EP | 0 823 454 B1 | 2/1998 |
| EP | 0 930 335 A | 7/1999 |
| EP | 0 931 815 A1 | 7/1999 |
| EP | 0 992 538 | 4/2000 |
| GB | 2299337 | 10/1996 |
| JP | 48-73448 | 12/1971 |
| JP | 3028244 B2 | 2/1991 |
| JP | 5-140384 | 6/1993 |
| JP | 5179068 | 7/1993 |
| JP | 7-138427 | 5/1995 |
| JP | 61-218650 | 9/1996 |
| JP | 11005874 A | 1/1999 |
| JP | 2000-256493 | 9/2000 |
| JP | 2000-290331 * | 10/2000 |
| WO | WO 87/05310 | 9/1987 |
| WO | WO 92/16587 | 10/1992 |
| WO | WO 94/01295 A | 1/1994 |
| WO | WO 97/14748 | 4/1997 |
| WO | WO 98/53000 | 11/1998 |
| WO | WO 99/02601 | 1/1999 |
| WO | WO 99/02601 A1 * | 1/1999 |
| WO | WO 99/31178 | 6/1999 |
| WO | WO 00/69966 | 11/2000 |

OTHER PUBLICATIONS

Ash, Michael; *Handbook of Plastic Compounds, Elastomers, and Resins*, VCH Publishers, Inc., pp. 216-217, © 1992, New York, NY.
*Synthetic Lubricants and High-Performance Functional Fluids*, Marcel Dekker, Inc., pp. 357-392, © 1999.
Japanese Abstract—No. 25380 (Jan. 27, 1998), Y. Minagawa, et al.
U.S. Appl. No. 09/592,757, filed Jun. 13, 2000 Waddell, et al.
E. Kresge, et al.: "Butyl Rubber"; *Kirk-Othmer Encycl. Of Chem. Techn.*—4th Ed., vol. 8, pp. 934-955; © 1993 by John Wiley & Sons.
"Rubber Compounding"; *Kirk-Othmer Encycl. Of Chem Techn.*—3rd Ed., vol. 20; pp. 384-390; © 1982 John Wiley & Sons.
"The Post Vulcanization Stabilization for NR", W.F. Helt, B.H. To & W.W. Paris, *Rubber World*, Aug. 1991, pp. 18-23.
"Formulation Design and Curing Characteristics of NBR Mixes for Seals", *Rubber World*, Sep. 1993, pp. 25-30.
U.S. Appl. No. 09/691,764, filed Oct. 18, 2000 Waddell, et al.
Wagner in Rubber Technology, M. Morton Ed., Kluwer Academic Publishers (the Netherlands, 1999 reprint), pp. 86-103.

* cited by examiner

COLORABLE ELASTOMERIC COMPOSITION

CROSS REFERENCE TO RELATED APPLICATIONS

This application is a divisional application of Ser. No. 10/398,270, filed Apr. 3, 2003, U.S. Pat. No. 6,939,921, which is a National Stage Application of International Application No. PCT/US01/32232, filed Oct. 16, 2001, which is a continuation of Ser. No. 09/691,764, filed Oct. 18, 2000, U.S. Pat. No. 6,710,116, the disclosures of which are herein incorporated by reference in their entireties.

FIELD OF THE INVENTION

The present invention relates to transparent and colorable elastomeric compositions and, more particularly, to transparent and colorable elastomeric compositions of a isoolefin copolymer comprising a halomethylstyrene derived unit with polybutene processing oil that can be used in reinforcing applications having a high abrasion resistance and traction.

BACKGROUND OF THE INVENTION

Rubber compositions are used in a variety of applications, including tire components such as treads and sidewalls, hoses, belts, footwear components, vibration isolation devices and bladders. While the particular rubber compositions used in each of these applications vary widely in their physical properties, one attribute remains the same—their color. Most rubber compositions are black. Furthermore, most rubber compositions eventually become discolored due to heat, light, ozone, etc. This is particularly true for rubbers used in stressful, demanding applications such as tire treads and sidewalls.

Practitioners in this field will point to the presence of the reinforcing filler "carbon black" as a prime reason that most rubbers are black. While this is true, carbon black is not the only factor. In fact, a wide variety of other fillers, curatives, antidegradants, oils and the rubbers themselves can all result in a dark color that is essentially impossible to pigment. In particular, naphthenic, aromatic, and paraffinic oils and resins can often cause discoloration and are undesirable. This is evident in compositions where carbon black has been replaced with a silica filler and the rubber is still discolored. For example, European Patent 0 682 071 B1 discloses a silica reinforced tire tread which, due to the presence of the aromatic processing aid, coupling agent, antidegradants and a sulfur curative system, will still be dark in color. In fact, it is uncertain how many of the ingredients present in the rubber composition would have to be changed to produce a colorable composition.

Resins and oils (or "processing aids") such as naphthenic, paraffinic, and aliphatic resins may be used to improve the processability of elastomeric compounds. However, increased processability in the presence of oils and resins comes at the price of a loss of air impermeability and an increase in undesirable color, among other undesirable effects of various other properties.

Polybutene and paraffinic-type processing oils have been disclosed in U.S. Pat. No. 4,279,284 to Spadone, U.S. Pat. No. 5,964,969 to Sandstrom et al. and EP 0 314 416 to Mohammed. A paraffinic-type processing oil is disclosed in U.S. Pat. No. 5,631,316 to Costemalle et al. Also, WO 94/01295 to Gursky et al. discloses the use of petroleum waxes and naphthenic oils and resins in a rubber composition for tire sidewalls, and U.S. Ser. No. 09/691,764, filed Oct. 18, 2000 (assigned to the assignee of the present invention) to Waddell et al. discloses a colorable rubber compositions. Other disclosures of processing oil or resin-containing elastomeric or adhesive compositions include U.S. Pat. Nos. 5,005,625, 5,013,793, 5,162,409, 5,178,702, 5,234,987, 5,234,987, 5,242,727, 5,397,832, 5,733,621, 5,755,899, EP 0 682 071 A1, EP 0376 558B1, WO 92/16587, and JP11005874, JP05179068A and JO3028244. None of these disclosures solves the problem of improving processability of elastomeric compositions useful for tires, air barriers, etc, while maintaining or improving the air impermeability of those compositions. Further, these materials may not be suitable for applications requiring high abrasion resistance while maintaining the colorability of the composition. Such is the case for, example, tire sidewalls and shoe soles.

White sidewalls on tires are a form of colorable rubber. The white color is achieved by using fillers such as silica, clay, talc and carbonates instead of carbon black and adding titanium dioxide as a whitening pigment. However, the white color comes with a price. The fillers are more fragile than carbon black and result in a weak rubber composition that does not reinforce the tire.

In applications such as shoe soles and tire treads where a large amount of a filler such as silica is used, it is desirable to maintain and adequately adjust certain physical properties such as the processability of the rubber, the cure rate, and final cure characteristics such as traction and abrasion resistance. In particular, abrasion resistance is desirable for colorable rubber compositions in, for example, tire sidewalls where there is a need for resistance to curb-scuffing. Also, in shoe soles and other shoe applications there is a need for an elastomeric composition that has long wear. An object of the present invention it to provide a colorable elastomeric composition that has improved abrasion resistance and other improved physical characteristics, while maintaining the colorability and transparency of the composition.

SUMMARY OF THE INVENTION

The present invention provides improved transparent and colorable elastomeric compositions. The transparent elastomeric compositions include isoolefin copolymers comprising a halomethylstyrene derived units blended with polybutene processing oil. The isoolefin copolymer can be alone in the composition or can be covulcanized with rubbers such as polybutadiene, polyisoprene, styrene-butadiene rubber, styrene-isoprene-butadiene rubber, isoprene-butadiene rubber, high cis-polybutadiene or natural rubber. The colorable rubber compositions have sufficient properties to function as a reinforcing member in an automobile tire or sufficient traction and abrasion resistance to function as a shoe sole. Preferably, the colorable elastomeric compositions of the invention include at least one copolymer of a $C_4$ to $C_7$ isoolefin and p-methylstyrene, at least one non-black filler such as a silica, at least one coupling agent, and polybutene processing oil.

DETAILED DESCRIPTION OF THE INVENTION

The term "phr" is parts per hundred rubber, and is a measure common in the art wherein components of a composition are measured relative to a major elastomer component, based upon 100 parts by weight of the elastomer or elastomers.

As used herein, in reference to Periodic Table "Groups", the new numbering scheme for the Periodic Table Groups are used as in HAWLEY'S CONDENSED CHEMICAL DICTIONARY 852 (13th ed. 1997).

The term "elastomer", as used herein, refers to any polymer or composition of polymers consistent with the ASTM D1566 definition. The term "elastomer" may be used interchangeably with the term "rubber", as used herein.

In one embodiment of the present invention, an elastomeric composition is produced which exhibits transparent properties. The term "transparent", as used herein is defined as transmission of light without substantial scattering such that visual identification can be made of objects behind the elastomeric composition. Degrees of transparency can vary from contact transparency to complete transparency. However, other embodiments of the invention are not limited to transparent compositions, such as those blended for tire treads.

Elastomer

Compositions of the present invention include at least one halogenated elastomer. The halogenated elastomer in one embodiment of the invention is a random copolymer of comprising at least $C_4$ to $C_7$ isoolefin derived units, such as isobutylene derived units, and halomethylstyrene derived units. The halomethylstyrene unit may be an ortho-, meta-, or para-alkyl-substituted styrene unit. In one embodiment, the halomethylstyrene derived unit is a p-halomethylstyrene containing at least 80%, more preferably at least 90% by weight of the para-isomer. The "halo" group can be any halogen, desirably chlorine or bromine. The halogenated elastomer may also include functionalized interpolymers wherein at least some of the alkyl substituents groups present in the styrene monomer units contain benzylic halogen or some other functional group described further below. These interpolymers are herein referred to as "isoolefin copolymers comprising a halomethylstyrene derived unit" or simply "isoolefin copolymer".

The isoolefin copolymer may also include other monomer derived units. The isoolefin of the copolymer may be a $C_4$ to $C_{12}$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The copolymer may also further comprise multiolefin derived units. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene, and other monomers such as disclosed in EP 0 279 456 and U.S. Pat. Nos. 5,506,316 and 5,162,425. Desirable styrenic monomer derived units that may comprise the copolymer include styrene, methylstyrene, chlorostyrene, methoxystyrene, indene and indene derivatives, and combinations thereof.

In another embodiment of the invention, the interpolymer is a random elastomeric copolymer of an ethylene derived unit or a $C_3$ to $C_6$ α-olefin derived unit and an halomethylstyrene derived unit, preferably p-halomethylstyrene containing at least 80%, more preferably at least 90% by weight of the para-isomer and also include functionalized interpolymers wherein at least some of the alkyl substituents groups present in the styrene monomer units contain benzylic halogen or some other functional group.

Preferred isoolefin copolymers may be characterized as interpolymers containing the following monomer units randomly spaced along the polymer chain:

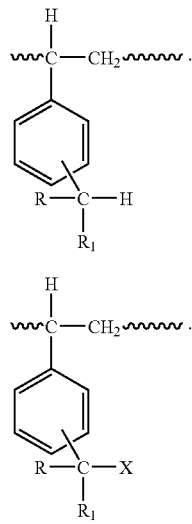

wherein R and $R^1$ are independently hydrogen, lower alkyl, preferably $C_1$ to $C_7$ alkyl and primary or secondary alkyl halides and X is a functional group such as halogen. Desirable halogens are chlorine, bromine or combinations thereof. Preferably R and $R^1$ are each hydrogen. The —$CRR_1H$ and —$CRR_1X$ groups can be substituted on the styrene ring in either the ortho, meta, or para positions, preferably para. Up to 60 mole % of the p-substituted styrene present in the interpolymer structure may be the functionalized structure (2) above in one embodiment, and in another embodiment from 0.1 to 5 mol %. In yet another embodiment, the amount of functionalized structure (2) is from 0.4 to 1 mol %.

The functional group X may be halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers, their method of preparation, methods of functionalization, and cure are more particularly disclosed in U.S. Pat. No. 5,162,445.

Most useful of such functionalized materials are elastomeric random interpolymers of isobutylene and p-methylstyrene containing from 0.5 to 20 mole % p-methylstyrene wherein up to 60 mole % of the methyl substituent groups present on the benzyl ring contain a bromine or chlorine atom, preferably a bromine atom (p-bromomethylstyrene), as well as acid or ester functionalized versions thereof wherein the halogen atom has been displaced by maleic anhydride or by acrylic or methacrylic acid functionality. These interpolymers are termed "halogenated poly(isobutylene-co-p-methylstyrene)" or "brominated poly(isobutylene-co-p-methylstyrene)", and are commercially available under the name EXXPRO™ Elastomers (ExxonMobil Chemical Company, Houston Tex.). It is understood that the use of the terms "halogenated" or "brominated" are not limited to the method of halogenation of the copolymer, but merely descriptive of the copolymer which comprises the isobutylene derived units, the p-methylstyrene derived units, and the p-halomethylstyrene derived units.

These functionalized polymers preferably have a substantially homogeneous compositional distribution such that at least 95% by weight of the polymer has a p-alkylstyrene content within 10% of the average p-alkylstyrene content of the polymer. More preferred polymers are also characterized by a narrow molecular weight distribution (Mw/Mn) of less than 5, more preferably less than 2.5, a preferred viscosity average molecular weight in the range of from 200,000 up to 2,000,000 and a preferred number average molecular weight in the range of from 25,000 to 750,000 as determined by gel permeation chromatography.

The copolymers may be prepared by a slurry polymerization of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional derived unit.

Preferred halogenated poly(isobutylene-co-p-methylstyrene) are brominated polymers which generally contain from 0.1 to 5 wt % of bromomethyl groups. In yet another embodiment, the amount of bromomethyl groups is from 0.2 to 2.5 wt %. Expressed another way, preferred copolymers contain from 0.05 up to 2.5 mole % of bromine, based on the weight of the polymer, more preferably from 0.1 to 1.25 mole % bromine, and are substantially free of ring halogen or halogen in the polymer backbone chain. In one embodiment of the invention, the interpolymer is a copolymer of $C_4$ to $C_7$ isomonoolefin derived units, a p-methylstyrene derived units and a p-halomethylstyrene derived units, wherein the p-halomethylstyrene units are present in the interpolymer from 0.4 to 1 mol % based on the interpolymer. In another embodiment, the p-halomethylstyrene is p-bromomethylstyrene. The Mooney Viscosity (1+8, 125° C., ASTM D1646, modified) is from 30 to 60 MU.

Filler

The elastomeric composition also contains a filler, preferably a non-black filler. These include, but are not limited to, silicas, clays, talcs, calcium carbonates, aluminum oxides, titanium oxides, and zinc oxides. Further, the transparent elastomer compositions of the present invention preferably do not contain carbon black. The transparent feature of the composition is obtained in part by using fillers composing from 10 to 100 parts, per hundred parts of rubber (phr), of the composition which are finer than the wavelength of visible light. Silica is preferred as the filler, however other fillers such as clays, talcs and other mineral fillers may be used. Carbon black may also be used to such an extent that the composition is no longer transparent or colorable.

The fillers of the present invention may be any size and typically range, e.g., in the tire industry, from about 0.0001 to about 100 microns. As used herein, silica is meant to refer to any type or particle size silica or another silicic acid derivative, or silicic acid, processed by solution, pyrogeric or the like methods and having a surface area, including untreated, precipitated silica, crystalline silica, colloidal silica, aluminum or calcium silicates, fumed silica, and the like.

The colorable compositions of the present invention are produced by replacing carbon black filler with a non-staining mineral filler such as, but not limited to, fumed or precipitated silicas, clays, talcs, calcium carbonates, aluminum oxides, titanium oxides, and zinc oxides. The preferred filler is silica present in the composition from 10 to 100 phr. The silica used in the transparent elastomeric compositions of the present invention is preferably a mixture of fumed and precipitated silicas. Also, the precipitated silica preferably composes from 30 to 80 parts of the transparent elastomeric composition. More preferably, it composes from 40 to 70 parts. Other suitable non-black fillers and processing agents (e.g., coupling agents) for these fillers are disclosed in the BLUE BOOK 275-302, 405-410 (Lippincott & Peto Publications, Rubber-World 2001). The coupling agent used in the transparent elastomeric compositions of the present invention is preferably an organosilane-cross-linking agent. Preferably, the organosilane-coupling agent composes from 2 to 15 weight percent, based on the weight of silica, of the transparent elastomeric composition. More preferably, it composes from 4 to 12 weight percent of the composition.

One or more cross-linking agents are preferably used in the elastomeric compositions of the present invention. More preferably, the coupling agent is a bifunctional organosilane cross-linking agent. By an "organosilane cross-linking agent" is meant any silane coupled filler and/or cross-linking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane (sold commercially as A1100 by Witco), gamma-mercaptopropyltrimethoxysilane (A189 by Witco) and the like, and mixtures thereof. In a preferred embodiment, bis-(3 (triethoxysilyl)-propyl)-tetrasulfane (sold commercially as Si69 by Degussa) is employed.

Polybutene Processing Oil

Polybutene processing oil is present in the composition of the invention. In one embodiment of the invention, the polybutene processing oil is a low molecular weight (less than 15,000 Mn) homopolymer or copolymer of olefin derived units having from 3 to 8 carbon atoms in one embodiment, preferably from 4 to 6 carbon atoms in another embodiment. In yet another embodiment, the polybutene is a homopolymer or copolymer of a $C_4$ raffinate. An embodiment of such low molecular weight polymers termed "polybutene" polymers is described in, for example, SYNTHETIC LUBRICANTS AND HIGH-PERFORMANCE FUNCTIONAL FLUIDS 357-392 (Leslie R. Rudnick & Ronald L. Shubkin, ed., Marcel Dekker 1999) (hereinafter "polybutene processing oil" or "polybutene").

In one embodiment of the invention, the polybutene processing oil is a copolymer of at least isobutylene derived units, 1-butene derived units, and 2-butene derived units. In one embodiment, the polybutene is a homopolymer, copolymer, or terpolymer of the three units, wherein the isobutylene derived units are from 40 to 100 wt % of the copolymer, the 1-butene derived units are from 0 to 40 wt % of the copolymer, and the 2-butene derived units are from 0 to 40 wt % of the copolymer. In another embodiment, the polybutene is a copolymer or terpolymer of the three units, wherein the isobutylene derived units are from 40 to 99 wt % of the copolymer, the 1-butene derived units are from 2 to 40 wt % of the copolymer, and the 2-butene derived units are from 0 to 30 wt % of the copolymer. In yet another embodiment, the polybutene is a terpolymer of the three units, wherein the isobutylene derived units are from 40 to 96 wt % of the copolymer, the 1-butene derived units are from 2 to 40 wt % of the copolymer, and the 2-butene derived units are from 2 to 20 wt % of the copolymer. In yet another embodiment, the polybutene is a homopolymer or copolymer of isobutylene and 1-butene, wherein the isobutylene derived units are from 65 to 100 wt % of the homopolymer or copolymer, and the 1-butene derived units are from 0 to 35 wt % of the copolymer.

Polybutene processing oils useful in the invention typically have a number average molecular weight (Mn) of less than 10,000 in one embodiment, less than 8000 in another embodiment, and less than 6000 in yet another embodiment. In one embodiment, the polybutene oil has a number average molecular weight of greater than 400, and greater than 700 in another embodiment, and greater than 900 in yet another embodiment. A preferred embodiment can be a combination of any lower limit with any upper limit herein. For example, in one embodiment of the polybutene of the invention, the polybutene has a number average molecular weight of from 400 to 10,000, and from 700 to 8000 in another embodiment. Useful viscosities of the polybutene processing oil ranges from 10 to 6000 cSt (centiStokes) at 100° C. in one embodiment, and from 35 to 5000 cSt at 100° C. in another embodiment, and is greater than 35 cSt at 100° C. in yet another embodiment, and greater than 100 cSt at 100° C. in yet another embodiment.

Commercial examples of such a processing oil are the PARAPOL™ Series of processing oils (ExxonMobil Chemical Company, Houston Tex.), such as PARAPOL™ 450, 700, 950, 1300, 2400 and 2500. The commercially available PARAPOL™ Series of polybutene processing oils are synthetic liquid polybutenes, each individual formulation having a certain molecular weight, all formulations of which can be used in the composition of the invention. The molecular weights of the PARAPOL™ oils are from 420 Mn (PARAPOL™ 450) to 2700 Mn (PARAPOL™ 2500) as determined by gel permeation chromatography. The MWD (Mw/Mn) of the PARAPOL™ oils range from 1.8 to 3 in one embodiment, and from 2 to 2.8 in another embodiment.

Below, Table 1 shows some of the properties of the PARAPOL™ oils useful in embodiments of the present invention, wherein the viscosity was determined as per ASTM D445-97, and the molecular weight by gel permeation chromatography.

TABLE 1

Properties of individual PARAPOL ™ Grades

| Grade | Mn | Viscosity @ 100° C., cSt |
|---|---|---|
| 450 | 420 | 10.6 |
| 700 | 700 | 78 |
| 950 | 950 | 230 |
| 1300 | 1300 | 630 |
| 2400 | 2350 | 3200 |
| 2500 | 2700 | 4400 |

Other properties of PARAPOL™ processing oils are as follows: the density (g/mL) of PARAPOL™ processing oils varies from about 0.85 (PARAPOL™ 450) to 0.91 (PARAPOL™ 2500). The bromine number (CG/G) for PARAPOL™ oils ranges from 40 for the 450 Mn processing oil, to 8 for the 2700 Mn processing oil.

The elastomeric composition of the invention may include one or more types of polybutene as a mixture, blended either prior to addition to the elastomer, or with the elastomer. The amount and identity (e.g., viscosity, Mn, etc.) of the polybutene processing oil mixture can be varied in this manner. Thus, PARAPOL™ 450 can be used when low viscosity is desired in the composition of the invention, while PARAPOL™ 2500 can be used when a higher viscosity is desired, or compositions thereof to achieve some other viscosity or molecular weight. In this manner, the physical properties of the composition can be controlled. More particularly, the phrases "a polybutene processing oil", or "polybutene processing oil" include a single oil or a composition of two or more oils used to obtain any viscosity or molecular weight (or other property) desired, as specified in the ranges disclosed herein.

The polybutene processing oil or oils are present in the elastomeric composition of the invention from 1 to 60 phr in one embodiment, and from 2 to 40 phr in another embodiment, from 4 to 35 phr in another embodiment, and from 5 to 30 phr in yet another embodiment. Preferably, the polybutene processing oil does not contain aromatic groups or unsaturation.

Additional Rubber Component

An additional rubber component may also be present in the elastomeric composition of the invention. The rubber may be present in the composition from 0 to 90 phr, from 20 to 80 phr in another embodiment. The transparent elastomeric compositions of the present invention are halogenated isoolefin/para-alkylstyrene terpolymers that can be covulcanized with polybutadiene, polyisoprene, styrene-butadiene rubber, styrene-isoprene-butadiene rubber, isoprene-butadiene rubber, high cis-polybutadiene or natural rubber. Some commercial examples of rubbers are NATSYN™ (Goodyear Chemical Company), natural rubber (SMR 20), and BUDENE™ 1207 or BR 1207 (Goodyear Chemical Company). The preferable covulcanate is high cis-polybutadiene (BR). By "cis-polybutadiene" or "high cis-polybutadiene", it is meant that 1,4-cis polybutadiene is used, wherein the amount of cis component is at least 95%. An example of high cis-polybutadiene commercial products used in the covulcanized composition BR 1207.

In one embodiment, the transparent elastomeric compositions of the present invention contains from 10 to 100 phr, of the poly(isoolefin-co-alkylstyrene) (copolymer of a $C_4$ to $C_7$ isoolefin and a alkylstyrene); from 10 to 100 phr of silica; from 0 to 20 weight percent based on the weight of the silica of a coupling agent; and 2-30 phr of a processing aid (discussed further below). In one embodiment, the colorable or transparent elastomeric compositions will also contain from 10 to 90 phr of polybutadiene, polyisoprene, styrene-butadiene rubber, styrene-isoprene-butadiene rubber, isoprene-butadiene rubber, high cis-polybutadiene or compositions thereof. More preferably, the transparent elastomeric compositions will contain from 20 to 80 phr of polybutadiene, polyisoprene, styrene-butadiene rubber, styrene-isoprene-butadiene rubber, isoprene-butadiene rubber, high cis-polybutadiene or compositions thereof.

Curing Agents and Accelerators

The compositions produced in accordance with the present invention typically contain other components and additives customarily used in rubber mixes, such as pigments, accelerators, cross-linking and curing materials, antioxidants, antiozonants, and fillers. In one embodiment, processing aids (resins) such as naphthenic, aromatic or paraffinic extender oils may be present from 1 to 30 phr. In another embodiment, naphthenic, aliphatic, paraffinic and other aromatic resins and oils are substantially absent from the composition. By "substantially absent", it is meant that naphthenic, aliphatic, paraffinic and other aromatic resins are present, if at all, to an extent no greater than 2 phr in the composition.

Generally, polymer compositions, e.g., those used to produce tires, are crosslinked. It is known that the physical properties, performance characteristics, and durability of vulcanized rubber compounds are directly related to the number (crosslink density) and type of crosslinks formed during the vulcanization reaction. (See, e.g., Helt et al., *The Post Vulcanization Stabilization for NR*, RUBBER WORLD 18-23 (1991). Cross-linking and curing agents include sulfur, zinc oxide, and fatty acids. Peroxide cure systems may also be used. Generally, polymer compositions may be crosslinked by adding curative molecules, for example sulfur, metal oxides (i.e., zinc oxide), organometallic compounds, radical initiators, etc. followed by heating. In particular, the following are common curatives that will function in the present invention: ZnO, CaO, MgO, $Al_2O_3$, $CrO_3$, FeO, $Fe_2O_3$, and NiO. These metal oxides can be used in conjunction with the corresponding metal stearate complex (e.g., Zn(Stearate)$_2$, Ca(Stearate)$_2$, Mg(Stearate)$_2$, and Al(Stearate)$_3$), or with stearic acid, and either a sulfur compound or an alkylperoxide compound. (See also, *Formulation Design and Curing Characteristics of NBR Mixes for Seals*, RUBBER WORLD 25-30 (1993). This method may be accelerated and is often used for the vulcanization of elastomer compositions.

Accelerators include amines, guanidines, thioureas, thiazoles, thiurams, sulfenamides, sulfenimides, thiocarbamates, xanthates, and the like. Acceleration of the cure process may be accomplished by adding to the composition an amount of the accelerant. The mechanism for accelerated vulcanization of natural rubber involves complex interactions between the curative, accelerator, activators and polymers. Ideally, all of the available curative is consumed in the formation of effective crosslinks, which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio) benzothiazole (MBS or MOR), compositions of 90% MOR and 10% MBTS (MOR 90), N-tertiarybutyl-2-benzothiazole sulfenamide (TBBS), and N-oxydiethylene thiocarbamyl-N-oxydiethylene sulfonamide (OTOS), zinc 2-ethyl hexanoate (ZEH), N,N'-diethyl thiourea (thiourea) (sold commercially as Thiate U by R.T. Vanderbilt).

In one embodiment of the invention, at least one curing agent is present from 0.2 to 15 phr, and from 0.5 to 10 phr in another embodiment. Curing agents include those components described above that facilitate or influence the cure of elastomers, such as metals, accelerators, sulfur, peroxides, and other agents common in the art.

Processing

The materials are mixed by conventional means known to those skilled in the art, in a single step or in stages. In one embodiment, the carbon black is added in a different stage from zinc oxide and other cure activators and accelerators. In another embodiment, antioxidants, antiozonants and processing materials are added in a stage after the carbon black has been processed with the elastomeric composition, and zinc oxide is added at a final stage to maximize compound modulus. Thus, a two to three (or more) stage processing sequence is preferred. Additional stages may involve incremental additions of filler and polybutenes.

The present invention provides improved elastomeric compositions comprising a copolymer of a $C_4$ to $C_7$ isoolefin and a p-methylstyrene, silica, polybutene, and optionally, one or more coupling agents. In order to improve certain physical properties of the composition, another rubber may also be also present. These compositions exhibit improved properties including improved abrasion resistance, reduced cut growth, improved adhesion, reduced heat build-up, and retention of mechanical properties during severe heat build-up conditions such as those experienced in "run-flat" tires and engine mounts for transportation vehicles. The substantially isoolefin (isobutylene in a desirable embodiment) backbone elastomer is a key element in that it imparts a self-limiting heat build-up. At lower temperatures, these elastomers exhibit high damping behavior, which dissipates mechanical energy in the form of heat. However, as the elastomer heats up, the damping behavior diminishes and the behavior of the elastomer in more elastic and less dissipative.

The materials are mixed by conventional means known to those skilled in the art, in a single step or in stages. For example, the elastomers of this invention can be processed in one step. In a preferred embodiment, the silica and silane are added in a different stage from zinc oxide and other cure activators and accelerators. In a more preferred embodiment, antioxidants, antiozonants and processing materials are added in a stage after silica and silane have been processed with the rubber, and zinc oxide is added at a final stage to maximize compound modulus. Thus, a two to three (or more) stage processing sequence is preferred. Additional stages may involve incremental additions of filler and processing aids.

The elastomeric compositions of the present invention are useful in a variety of applications, particularly pneumatic tire components, especially sidewalls, as well as hoses, belts, solid tires, footwear components, rollers for graphic arts applications, vibration isolation devices, pharmaceutical devices, adhesives, sealants, protective coatings and bladders for fluid retention and curing purposes. More detailed descriptions of tire components can be found in *Pneumatic Tire Compounding*, W. H. Waddell, R. S. Bhakuni, W. W. Barbin, and P. H. Sandstrom in THE VANDERBILT RUBBER HANDBOOK, 596-611 (R.T. Vanderbilt Company, Inc. 1990), and a description of hose and shoe components in THE VANDERBILT RUBBER HANDBOOK, 612-727.

One embodiment of the present invention is an elastomeric composition comprising a copolymer of a $C_4$ to $C_7$ isoolefin and a p-methylstyrene, a non-black filler; and polybutene. The composition may also comprise a secondary rubber selected from polybutadiene, polyisoprene, styrene-butadiene rubber, styrene-isoprene-butadiene rubber, isoprene-butadiene rubber, high cis-polybutadiene or compositions thereof. Another embodiment of the present invention includes compositions isoolefin copolymers comprising a halomethylstyrene derived units such as poly(isobutylene-co-p-methylstyrene) and halogenated poly(isobutylene-co-p-methylstyrene) with a non-carbon black filler such as silica or clay, and polybutene processing oil.

The colorable elastomeric compositions of the present invention have sufficient properties to function as shoe soles and other shoe components and as a reinforcing member in an automobile tire, as well as other applications where a colorable, transparent material is desired. The colorable elastomeric compositions of the present invention are useful in making colored elastomeric products capable of meeting current performance requirements. These colorable compounds were produced by replacing carbon black filler with a non-staining mineral filler such as, but not limited to, fumed or precipitated silicas, clays, talcs, calcium carbonates, aluminum oxides, titanium oxides, and zinc oxides. The mineral filler should reinforce the polymer system and not inhibit pigmentation to be effective. In addition, the remaining components of the colorable compound were selected on the basis that they will not interfere with the colorable nature of the elastomer. The cured, colorable compounds of the present invention still have the same dynamic and physical properties that meet the performance demands of current black-colored tire treads.

All components of the transparent and colorable elastomeric compositions should be carefully selected so that they will not interfere with the transparency and/or colorability of the composition. For example, the elastomers, fillers, processing aids, antidegradants and curatives should not discolor the composition during the formation of the elastomeric composition. Furthermore, the components should not discolor the elastomeric composition as a result of exposure to light (including UV), heat, oxygen, ozone and strain.

The elastomeric compositions of the present invention are not only capable of being transparent or colorable, but can be covulcanized with other rubbers. The transparency will depend upon the amount of filler used. This results in an elastomer that can be used in wide variety of applications outside of the uses for known elastomers. The elastomeric compositions of the present invention are useful in a variety of applications, particularly pneumatic tire components, hoses, belts, solid tires, footwear components, rollers for graphic arts applications, vibration isolation devices, pharmaceutical devices, adhesives, sealants, protective coatings and bladders for fluid retention and curing purposes. In particular, the elastomeric compositions of the present invention can be used in shoe soles and tires.

The colorable elastomeric compositions of the present invention exhibit improved hysteretic properties, traction, heat stability and retention of properties upon aging to known colorable elastomers. This results in colorable rubber compositions which have sufficient properties to function as a reinforcing member in an automobile tire. The colorable rubber will allow a manufacturer to produce a tire with improved product appearance.

In one embodiment of the invention, a tire sidewall can be formed by combining at least one copolymer of a $C_4$ to $C_7$ isoolefin and a p-methylstyrene derived units, at least one filler; at least one polybutene processing oil having a number average molecular weight of at least 400; and at least one cure agent; and curing the combined components.

Test Methods

Cure properties were measured using a MDR 2000 at the indicated temperature and 0.5 degree arc. Test specimens were cured at the indicated temperature, typically from 150° C. to 160° C., for a time corresponding to T90+appropriate mold lag. When possible, standard ASTM tests were used to determine the cured compound physical properties. Stress/strain properties (tensile strength, elongation at break, modulus values, energy to break) were measured at room temperature using an Instron 4202. Shore A hardness was measured at room temperature by using a Zwick Duromatic. Abrasion loss was determined at room temperature by weight difference by using an APH-40 Abrasion Tester with rotating sample holder (5 N counter balance) and rotating drum. Weight losses were indexed to that of the standard DIN compound with lower losses indicative of a higher abrasion resistance index. The error ($2\sigma$) in measuring 100% Modulus is ±0.11 MPa units; the error ($2\sigma$) in measuring elongation is ±13% units. The error ($2\sigma$) in tensile measurements is ±0.47 MPa units.

The values "MH" and "ML" used here and throughout the description refer to "maximum torque" and "minimum torque", respectively. The "MS" value is the Mooney scorch value, the "ML(1+4)" value is the Mooney viscosity value. The error ($2\sigma$) in the later measurement is ±0.65 Mooney viscosity units. The values of "Tc" are cure times in minutes, and "Ts" is scorch time".

Dynamic properties (G*, G', G" and tangent delta) were determined using a MTS 831 mechanical spectrometer for pure shear specimens (double lap shear geometry) at temperatures of –20° C., 0° C. and 60° C. using a 1 Hz frequency at 0.1, 2 and 10% strains. Temperature-dependent (–80° C. to 60° C.) dynamic properties were obtained using a Rheometrics ARES at Sid Richardson Carbon Company, Fort Worth, Tex. and at ExxonMobil Chemical, Baytown, Tex. A rectangular torsion sample geometry was tested at 1 Hz and appropriate strain. Values of G" or tangent delta measured at 0° C. in laboratory dynamic testing can be used as predictors of tire traction for carbon black-filled BR/sSBR (styrene-butadiene rubber) compounds. Temperature-dependent (–90° C. to 60° C.) high-frequency acoustic measurements were performed at Sid Richardson Carbon Company using a frequency of 1 MHz and ethanol as the fluid medium.

Molecular weight of the PARAPOL™ polybutene processing oil was determined by gel permeation chromatography, and the values of number average molecular weight (Mn) obtained have an error of ±20%. The techniques for determining the molecular weight (Mn and Mw) and molecular weight distribution (MWD) are generally described in U.S. Pat. No. 4,540,753 to Cozewith et al. and references cited therein, and in Verstrate et al., 21 MACROMOLECULES 3360 (1988). In a typical measurement, a 3-column set is operated at 30° C. The elution solvent used may be stabilized tetrahydrofuran (THF), or 1,2,4-trichlorobenzene (TCB). The columns are calibrated using polystyrene standards of precisely known molecular weights. A correlation of polystyrene retention volume obtained from the standards, to the retention volume of the polymer tested yields the polymer molecular weight. The viscosity of the PARAPOL™ polybutene processing oil (Table 1) was determined as per ASTM D445-97. Other test methods are listed in TABLE 7.

EXAMPLES

Example 1

Experiments were conducted to produce transparent elastomers. Masterbatches of EXXPRO™ Elastomers (a copolymer or "terpolymer" of isobutylene, p-methylstyrene and p-bromomethylstyrene derived units, commercially available from ExxonMobil Chemical Company) of varying bromination level, comonomer content, and molecular weight were prepared. The copolymers had the properties listed in Table 2.

TABLE 2

Properties of the Elastomers

| PROPERTY | TERPOLYMER | | |
| --- | --- | --- | --- |
| | EXXPRO ™ 97-2 | EXXPRO ™ 89-1 | EXXPRO ™ 90-10 |
| p-methylstyrene (wt. %) | 10 | 5.0 | 7.5 |
| p-bromomethylstyrene (mol %) | 0.98 | 0.75 | 1.20 |
| Mooney Viscosity (ML(1 + 8)125° C.) | 45 ± 5 | 38 ± 5 | 45 ± 5 |

Test compositions were compounded to composition the masterbatch components and the cure additives listed in Table 4. FLEXON™ 785 is a naphthenic petroleum oil. DIAK #1 is hexamethylene diamine carbonate, available from Du Pont/Dow elastomers. DPG is diphenylguanidine.

The test compositions (A through F) were tested for cure characteristics, hardness and tensile strength. The values "MH" and "ML" used here and throughout the description refer to "maximum torque" and "minimum torque", respectively. The "MS" value is the Mooney scorch value, the "ML (1+4)" value is the Mooney viscosity value. The values of "T" are cure times in minutes, and "Ts" is "scorch time". The results are presented in Table 5. The test compositions A-F demonstrated contact transparency.

Example 2

A Minolta CR-100 ChromaMeter was used to quantitatively determine the lightness (L*), red-green (a*) and yellow-blue (b*) colors of cured compounds in order to maximize light through-put (a measure of transparency) and to minimize or adjust the color. The ability to read print through these cured rubber compounds was also used as a subjective evaluation of the contact transparency of the ingredients in the formulation. Statistically designed experiments varying ingredients, and statistical analysis of variance (ANOVA) for effects on compound cure, physical and color properties were made.

Eight formulations (G-N) of EXXPRO™ elastomers with statistically varying p-methylstyrene and p-bromomethylstyrene levels were evaluated in a simple compound prepared only with precipitated silica and a zinc oxide/zinc stearate cure system. It was established that low levels of either bromine and/or p-methylstyrene provided the highest L* values with low, but not negative, a* and b* values, see Table 6. EXXPRO™ MDX 89-1 (5 wt-% pMS, 0.75 mol-% BrPMS) afforded the highest L* and lowest a* and b* values.

Example 3

Ten curative/accelerator systems thought useful in co-curing with the other sulfur-vulcanized tire compounds were screened. Acceptable curatives were obtained using zinc oxide/stearic acid; zinc oxide/zinc stearate; hexamethylene-1,6-bis(thiosulphate) disodium salt dihydrate (sold commercially as DURALINK HTS™ by Flexsys)/zinc stearate; DURALINK HTS™/zinc oxide; and 1,3-Bis(citraconimidomethyl)benzene (sold commercially as PERKALINK™ 900 by Flexsys)/zinc stearate, since their use afforded transparent compounds from nearly colorless to a yellow or beige color. Butyl zimate/zinc stearate afforded a transparent, light brown-colored compound. The use of CBS (N-cyclohexyl-2-benzothiazole sulfenamide) afforded a beige compound, amylphenyl disulfide polymer (18.5-21% sulfur) (sold commercially as VULTAC 5 by Elf Atochem North America) afforded a gray compound, and A1100 afforded a brown compound; none were visibly transparent based on the ability to read print. Other organic peroxides can be used if they are not carried on a mineral filler such as clay.

Example 4

The curing of the elastomeric composition when EXXPRO™ Elastomer is present without in the absence of other rubbers was studied using various accelerators. Accelerators were evaluated at a fixed level of zinc oxide, stearic acid, and zinc stearate ($ZnSt_2$). Accelerators included the following (trade names in parenthesis): alcohol-amine (Triethanolamine), zinc dithiocarbamate (Methyl Zimate), thiuram (Methyl Tuads), thiosulfate (Duralink HTS), thiourea (Thiate U), sulfeneamide (CBS), thiazole (MBTS), zinc thiazole (ZMBT), amine (Hexamethylenetetramine), and amine (Diak #3). The use of Thiate U in the system at 160° C. showed a significant reduction in cure time, as shown in Table 7. In all of the test compositions in Table 7, the following components and amounts were present: EXXPRO™ 90-10 at 100 phr, Silica (Zeosil 1165 MP) at 50 phr, processing aid (Sundex 8125) at 20 phr, stearic acid (HSt) at 1.8 phr, zinc oxide (ZnO) at 3 phr, zinc stearate ($ZnSt_2$) at 0.6 phr, and the accelerators at 0.6 phr. Using the zinc oxide, zinc stearate and Thiate U cure/accelerator system provides the fastest cure times with while maintaining good mechanical properties. These accelerators were also tested at 180° C., with similar results (not shown).

Example 5

Precipitated silicas made via an aqueous acidification process were screened as a filler for the composition, wherein EXXPRO™ MDX 89-1 is the elastomer and DURALINK HTS™/zinc stearate as the curative system. It was observed that for precipitated silicas having approximately the same CTAB surface area (approximately 170 $m^2/g$), use of a precipitated silica having a higher salt content afforded a brown-colored transparent compound (Zeosil 1165 MP from Rhone Poulenc) compared to lower salt-content precipitated silicas which afforded yellow-colored transparent compounds. Use of a precipitated silica prepared using $CO_2$/hydrogen chloride as the acid (Hi-Sil 243LD from PPG) is more desirable than one prepared using sulfuric acid (Zeopol 8745 from J. M. Huber) since the former afforded a fainter-yellow transparent compound. Use of a higher surface area, low salt-containing precipitated silica (Hi-Sil 195G from PPG) is more desirable since it appeared to afford a more contact transparent compound, and improved cured compound physical properties. Use of a high surface area fumed silica made via a gas phase condensation process, which affords a silica with essentially no salt (Cab-O-Sil M5 from Cabot) is desirable for optical properties.

Example 6

In this example, the elastomeric composition is a mixture of EXXPRO™ Elastomers and polybutene processing aid such as PARAPOL™. A variation of the PARAPOL™ component from 10 phr to 20 phr when Thiate U is used as the accelerator shows that increasing the PARAPOL™ 950 content increases the transparency (ChromaMeter-L value is higher) and reduces the yellowness (ChromaMeter-b* value is lower) as shown in Table 8 in test compositions O-T. These data shown that the Din Abrasion index value is relatively low, but the presence of PARAPOL™ improves the optical properties when compared to the optical properties of EXXPRO™ Elastomers alone as shown in Table 8. The b* values for samples O-T are low when compared to the values in Table 8, while the L values advantageously increased for the O-T samples relative to the values in Table 8.

Example 7

The test compositions U-X in this example are mixtures of EXXPRO™ elastomers and NATSYN™ 2200 rubber in the absence of PARAPOL™. Transparent cured EXXPRO™ Elastomer compounds were prepared using precipitated and fumed silicas as the fillers, and a sulfur curing system. All cured compounds were contact transparent, but had a yellow to brown color depending upon the specific ingredients, and afforded compounds with physical properties appropriate for use in a variety of rubber applications. Test compositions U-X are shown in Table 9. The Din Abrasion index values are relatively low when high cis-polybutadiene is not present, although higher than those values in Table 8 when EXXPRO™ Elastomers is the only elastomer/rubber component. Further, in the absence of PARAPOL™, the optical properties are diminished as seen by the lower L values and higher b* values relative to those in, for example, Table 8, compositions O-T.

Example 8

A composition for a colorable tire tread was prepared as shown in Table 10. This composition differs from a standard tire tread formulation in several ways. For example, EXXPRO™ Elastomer polymers are used instead of an equal weight of solution-polymerized styrene butadiene rubber (sSBR) to improve cured compound dynamic and physical properties. Also, Si69 is used as the silane-coupling agent instead of the more common X50S (which is 50% by weight Si69 carried on N330 carbon black). In addition, no antiozonant is used since this can also stain or discolor the tread composition. Compound colorability can be further improved by using titanium dioxide as a non-reinforcing, but whitening pigment. Variations on this formulation are found in Example 9.

Example 9

The test compositions A1-H1 in the present example are variations on the composition in Table 10, using an EXXPRO™ elastomer and an sSBR having varying amounts of either styrene comonomer or vinyl comonomer. The viscoelastic nature of EXXPRO™ elastomers increases the loss modulus (G") or tangent delta values of the cured compound measured at 0° C. (Table 11). This dynamic value is a laboratory test useful in predicting the wet traction performance of tread compounds on tires. A higher value is desirable. The tangent delta value measured at 60° C. in lab instruments is reduced when using EXXPRO™ elastomers indicating a lower heat build-up value. This is predictive of tire rolling resistance. A lower value is desirable. The complex modulus value (G*) measured at 60° C. is used as a lab predictor of the dry handling, or cornering, characteristics of the tread compound on the tire. A higher value is needed when a higher speed rated tire (i.e. H-, V-, Z-rated) is desirable. The magnitude of these benefits when using EXXPRO™ Elastomers is also dependent on the particular polymers used in the composition system. When sSBR is used instead of a cis-polybutadiene, the Din Abrasion index values are low.

Example 10

The effect of using an alkylperoxide cure system Varox 231XL (R.T. Vanderbilt) in place of the traditional sulfur cure system was studied using an EXXPRO™ elastomer and a mix of other rubbers. Varox 231 XL is 1,1-bis(t-butylperoxyl)-3,3,5-trimethylcyclohexane as 40% active on an inert carrier of calcium carbonate (32%) and silicon dioxide (28%). Tests performed on compositions I1 (sulfur cure) and J1 (alkylperoxide cure) in Table 12 show that the use of a peroxide cure system increases transparency (higher ChromaMeter-L value) and decreases the yellow color (lower ChromaMeter-b* value) compared to the use of a sulfur cure system in a cured compound using FLEXON™ 766 as the processing aid. Overall, the use of the alkylperoxide system improves the optical properties of the system when I1 (sulfur cure) is compared to J1 (alkylperoxide cure), but the Din Abrasion index values are relatively low due to the presence of NATSYN™ 2200.

Example 11

The test compositions K1 and L1 in Table 13 shown the effects of using the alkylperoxide cure system with Thiate U, and using the PARAPOL™ processing aid. Comparing the data in Table 12 with Table 13, it is apparent that the optical properties are improved for the test compositions K1 and L1 over I1 and J1. When PARAPOL™ 950 is used in place of the conventional processing aid in the peroxide cured outsole formulation, optical properties are improved by reduced yellowness (b*) and increased transparency (L) as shown in Table 13.

Example 12

The present set of test compositions M1-P1 shows the improved properties of the elastomeric composition when EXXPRO™ elastomers and BR 1207 are used as the primary components with the processing aid PARAPOL™, an alkylperoxide (not associated with a carrier) is used as the cure agent, and Thiate U is used as an accelerator. The example 12 compositions represent the preferred embodiments of the present invention (Table 14).

Brominated poly(isobutylene-co-p-methylstyrene)-containing formulations for tire tread and rubber outsole applications were developed using binary compositions of EXXPRO™ MDX 90-10 with high cis-polybutadiene rubber (BR 1207, BUDENE™ 1207). The EXXPRO™ Elastomer is used predominantly for improving traction properties, while the polybutadiene is used to improve abrasion resistance. For shoe soles, polymers were filled with precipitated and fumed silicas in order to reinforce the polymers, but also to maintain good colorability for appearance. A silane coupling agent is used in the present example in order to further increase the abrasion resistance of polybutadiene formulations, but has little effect in EXXPRO™ Elastomers. Thus, processing aids such as PARAPOL™ 950 and PARAPOL™ 2500 were added as part of the compositions. Table 14 lists the ingredients in test compositions M1-P1 used in testing. Trigonox 29 is an alkyl peroxide made by Akzo Nobel Chemicals, and is 1,1-di-tert-butylperoxy-3,3,5-trimethylcyclohexane. Trigonox 29, unlike some alkyl peroxides sold commercially is not on a carrier.

Processing, cure, mechanical, and optical properties were measured for these test compounds, the data for which is shown in Table 15A. These values were obtained using the methods described in the previous examples. The "T" values are cure times in minutes. "MOD" values are modulus values, and the ChromaMeter values are as described above. Lab abrasion index (resistance), tensile strength and elongation at break values increase with increasing high cis-polybutadiene (BR 1207) content. However, increased use of BR reduces the traction of the composition. Since increased use of EXXPRO™ Elastomers increases traction, a balance of properties can be achieved depending upon the particular application of the elastomeric composition.

Surprisingly, the use of the relatively higher molecular weight PARAPOL™ 2500 in place of the PARAPOL™ 950 results in reduced yellowing as indicated by the ChromaMeter-b* values, and increased hardness, tensile strength, and elongation at break values. Further, when comparing test composition M1 (PARAPOL™ 950 present 10 phr) with test composition P1 (PARAPOL™ 2500 present 10 phr), it is found that the viscosity (MV: ML(1+4)) increases with increasing molecular weight of the processing aid. Overall, the use of BR 1207 improves the Din Abrasion index values when compared to the V-X test compositions in Table 9 where the rubber component NATSYN™ is used instead of BR 1207. Further, the optical properties of the compositions M1-P1 are improved as compared to test compositions V-X in Table 9 due to the presence of the PARAPOL™ processing aid in place of the FLEXON™ oil.

The viscoelastic nature, or "dynamic properties", of the samples M1-P1 were also measured as described above and are shown in Table 15B. The loss modulus (G") or tangent delta values of the cured compounds were measured at −60, −30, 0, 30 and 60° C. These dynamic values at 0° are laboratory tests useful in predicting the wet traction performance of tread compounds on shoes and tires. A higher value is desirable. The dynamic values at −30° C. are predictors of snow traction, while the 30° C. values are predictors of dry traction. The dynamic values at 60° C. are an indicator rolling resistance. The tangent delta value measured at 60° C. in lab instruments is reduced when using EXXPRO™ Elastomers, indicating a lower heat build-up value. This is predictive of tire rolling resistance. A lower value is desirable. The complex modulus value (G*) measured at 60° C. is used as a lab predictor of the dry handling, or cornering, characteristics of the tread compound on the tire. A higher value is needed when a higher speed rated tire (i.e. H-, V-, Z-rated) is desirable.

While certain representative embodiments and details have been shown for the purposes of illustrating the invention, it will be apparent to those skilled in the art that various changes in the process and products disclosed herein may be made without departing from the scope of the invention, which is defined in the appended claims.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 3

Test Methods

| Parameter | Units | Test |
|---|---|---|
| Mooney Viscosity (polymer) | ML 1 + 8, 125° C., MU | ASTM D 1646 (modified) |
| Brittleness | ° C. | ASTM D 746 |
| Green Strength (100% Modulus) | PSI | ASTM D 412 |
| Mooney Viscosity (compound) | ML 1 + 4, 100° C., MU | ASTM D 1646 |
| Mooney Scorch Time | $T_S 5$, 125° C., minutes | ASTM D 1646 |
| Oscillating Disk Rheometer (ODR) @ 160° C., ±3° arc | | |
| ML | deciNewton.meter | |
| MH | dNewton.m | |
| $T_S 2$ | minute | |
| $T_C 90$ | minute | |
| Cure rate | dN.m/minute | ASTM D 2084 |
| Physical Properties press cured Tc 90 + 2 min @ 160° C. | | |
| Hardness | Shore A | ASTM D 2240 |
| Modulus 100% | MPa | ASTM D 412 die C |
| Tensile Strength | MPa | |
| Elongation at Break | % | |
| Hot Air Aging, 72 hrs. @ 125° C. | | ASTM D 573 |
| Hardness Change | % | |
| Tensile Change | % | |
| Elongation Change | % | |
| Weight Change | % | |
| Tear Strength Die B & Die C | N/mm | ASTM D 624 |

TABLE 4

Formulations of Test Compositions A-F

| RECIPES | A | B | C | D | E | F |
|---|---|---|---|---|---|---|
| Master Batch (phr) | | | | | | |
| EXXPRO ™ 89-1 | 100 | 100 | 100 | — | — | — |
| EXXPRO ™ 97-2 | — | — | — | 100 | 100 | 100 |
| HiSil 233 | 45 | 45 | 45 | 45 | 45 | 45 |
| FLEXON ™ 785 | 14 | 14 | 14 | 14 | 14 | 14 |
| DIAK #1 | 3 | 4 | 4 | 3 | 4 | 4 |
| DPG | 3 | 2 | 3 | 3 | 2 | 3 |

TABLE 5

Properties of Test Compositions A-F

| Properties | A | B | C | D | E | F |
|---|---|---|---|---|---|---|
| MS @ 135° C. | | | | | | |
| 5 pt. Rise, min. | — | — | 4.14 | 2.17 | 0.42 | 1.67 |
| 10 pt. Rise, min. | — | — | 4.33 | 2.57 | 1.75 | 1.89 |
| ML(1 + 4)@ 100° C. | — | 108 | 125 | 127 | — | 128 |
| MDR @ 155° C., ½° Arc | | | | | | |
| ML, dN · m | 5.88 | 5.76 | 4.67 | 3.23 | 2.67 | 5.67 |
| MH, dN · m | 12.5 | 17.0 | 15.5 | 15.3 | 15.0 | 15.1 |
| Ts2, min | 1.7 | 1.2 | 0.9 | — | — | 1.1 |
| T25, min | 1.2 | 1.7 | 1.2 | — | — | 1.3 |
| T90, min | 35.3 | 31.3 | 27.8 | 25.9 | — | 28.9 |
| Physical Properties, Cured 6.5' @ 155° C. | | | | | | |
| Shore A | 60 | 60 | 60 | 64 | 58 | 61 |
| 100% Modulus, MPa | 1.5 | 2.6 | 2.6 | 2.6 | 2.2 | 2.0 |
| 300% Modulus, MPa | 4.6 | 5.8 | 6.2 | 6.1 | 8.2 | 4.8 |
| Tensile, MPa | 6.0 | 7.6 | 9.1 | 8.8 | 8.7 | 7.1 |
| Elongation, % | 380 | 380 | 390 | 420 | 320 | 390 |
| DIN Abrasion | 71 | — | 66 | 69 | 69 | 68 |

TABLE 6

Optical Properties of EXXPRO ™ Rubber Compounds

| Test Composition | p-methylstyrene (weight-%) | p-bromomethylstyrene (mole-%) | L* | a* | b* |
|---|---|---|---|---|---|
| G | 5 | 0.75 | 70.7 | 0.5 | 18.1 |
| H | 7.5 | 0.75 | 65.1 | 2.3 | 26.8 |
| I | 7.5 | 1.7 | 58.8 | 5.4 | 38.9 |
| J | 9.6 | 1.25 | 56.7 | 5.9 | 39.0 |
| K | 10 | 0.5 | 69.0 | 1.9 | 21.0 |
| L | 10 | 0.75 | 67.3 | 2.5 | 27.9 |
| M | 10 | 0.95 | 55.2 | 5.1 | 36.3 |
| N | 12.5 | 0.75 | 58.6 | 7.8 | 31.7 |

TABLE 7

Formulations and Properties of Test Compositions for Example 4 Test Accelerator Compounds.

| Accelerators | None | ZnSt$_2$ | Triethanol-amine | Methyl Zymate | Methyl Tuads | Duralink HTS | Thiate U | CBS | MBTS | ZMBT | Hexa-methylene-tetramine | Diak #3 |
|---|---|---|---|---|---|---|---|---|---|---|---|---|
| MDR @160° C., ½° arc | | | | | | | | | | | | |
| ML, dN · m | 4.61 | 4.2 | 6.39 | 10.26 | 6.34 | 4.83 | 3.94 | 3.59 | 4.44 | 4.6 | 4.47 | 8.66 |
| MH, dN · m | 9.7 | 9.08 | 13.52 | 12.73 | 13.66 | 12.48 | 12.52 | 10.22 | 8.6 | 8.47 | 11.39 | 10.17 |
| MH-ML, dN · m | 5.09 | 4.88 | 7.13 | 2.47 | 7.32 | 7.65 | 8.58 | 6.63 | 4.16 | 3.87 | 6.91 | 1.51 |
| Ts2 (min) | 4.08 | 7.77 | 8.42 | 25.61 | 4.38 | 2.08 | 0.66 | 0.82 | 8.59 | 12.2 | 2.65 | 0 |
| T25 (min) | 1.18 | 1.19 | 7.65 | 16.67 | 4.09 | 1.96 | 0.7 | 0.54 | 1.16 | 2.48 | 1.67 | 21.65 |
| T50 (min) | 8.37 | 11.53 | 13.92 | 20.1 | 8.18 | 4.52 | 1.33 | 8.51 | 9.42 | 11.56 | 7.8 | 24.29 |
| T75 (min) | 19.17 | 20.83 | 20.98 | 24.42 | 15.6 | 10.83 | 3.18 | 18.61 | 19.54 | 20.38 | 15.35 | 26.97 |
| T90 (min) | 25.67 | 26.21 | 25.99 | 27.46 | 22.84 | 20.13 | 7.85 | 25.07 | 25.53 | 25.88 | 22.41 | 28.73 |
| T95 (min) | 27.81 | 28.03 | 27.87 | 28.67 | 25.99 | 24.82 | 13.6 | 27.45 | 27.65 | 27.88 | 25.71 | 29.35 |
| RATE | 1.9 | 1.9 | 0.5 | 0.4 | 0.9 | 2.2 | 4.5 | 13.2 | 1.5 | 1.4 | 2.9 | 0.3 |
| T90 + 5 minutes cured @ 160° C. | | | | | | | | | | | | |
| SHORE A 23° C. | 43.5 | 46.7 | 53.3 | 48.3 | 49.9 | 49.1 | 52.9 | 43.9 | 42.7 | 44.3 | 52.5 | 46.3 |
| 20% Modulus (MPa) | 0.61 | 0.61 | 0.81 | 0.73 | 0.73 | 0.73 | 0.79 | 0.62 | 0.59 | 0.65 | 0.79 | 0.67 |
| 100% Modulus (MPa) | 1 | 1.04 | 1.39 | 1.25 | 1.21 | 1.28 | 1.95 | 0.96 | 0.97 | 0.97 | 1.43 | 1.11 |
| 200% Modulus (MPa) | 1.58 | 1.7 | 2.48 | 2.28 | 2.21 | 2.29 | 4.82 | 1.54 | 1.44 | 1.46 | 2.41 | 1.85 |
| 300% Modulus (MPa) | 2.65 | 2.95 | 4.17 | 4.17 | 4.18 | 4.1 | 4.02 | 8.71 | 2.67 | 2.35 | 2.4 | 4.02 | 3.22 |
| TENSILE, MPa | 8.95 | 11.49 | 12.27 | 13.65 | 12.76 | 11.48 | 12.57 | 11.23 | 11.69 | 11.21 | 11.89 | 11.02 |
| ELONGATION % | 720 | 717 | 702 | 633 | 643 | 650 | 392 | 759 | 814 | 784 | 583 | 681 |
| ENERGY at Break (J) | 9.13 | 10.78 | 12.16 | 10.57 | 10.34 | 10.16 | 6.66 | 11.04 | 11.99 | 11.03 | 8.55 | 9.59 |

TABLE 8

Formulations and Properties of Test Compositions O-T from Example 6.

| | O | P | Q | R | S | T |
|---|---|---|---|---|---|---|
| Ingredient (phr) | | | | | | |
| EXXPRO ™ 89-4 | 100.0 | 100.0 | 100.0 | 0.0 | 0.0 | 0.0 |
| EXXPRO ™ 96-4 | 0.0 | 0.0 | 0.0 | 100.0 | 100.0 | 100.0 |
| Silica, Rhodia Zeosil 45 | 30.0 | 35.0 | 25.0 | 25.0 | 35.0 | 30.0 |
| PARAPOL ™ 950 | 15.0 | 10.0 | 10.0 | 20.0 | 20.0 | 15.0 |
| Zinc Stearate | 3.5 | 2.0 | 5.0 | 2.0 | 5.0 | 3.5 |
| Thiate U | 1.5 | 3.0 | 3.0 | 3.0 | 3.0 | 1.5 |
| Cure and Physical Properties | | | | | | |
| Minimum Torque, dN · m | 3.1 | 4.5 | 2.9 | 2.1 | 3.1 | 3.3 |
| Maximum Torque, dN · m | 7.9 | 9.0 | 6.0 | 5.0 | 6.0 | 7.7 |
| Ts2 (min) | 0.9 | 2.3 | 1.5 | 4.0 | 1.5 | 1.4 |
| T50 (min) | 1.2 | 2.7 | 1.1 | 2.2 | 1.0 | 1.6 |
| T90 (min) | 6.3 | 12.7 | 3.5 | 11.2 | 3.0 | 7.9 |
| Hardness | 46.7 | 51.5 | 45.7 | 43.1 | 42.9 | 47.1 |
| % Elongation at Break | 170.0 | 226.0 | 215.0 | 208.0 | 177.0 | 229.0 |
| Tensile Strength (MPa) | 5.4 | 8.1 | 5.2 | 4.1 | 4.0 | 5.4 |
| 20% Modulus (MPa) | 0.8 | 0.9 | 0.6 | 0.4 | 0.8 | 0.7 |
| 100% Modulus (MPa) | 3.0 | 3.4 | 2.1 | 1.5 | 2.6 | 2.3 |
| 300% Modulus (MPa) | 1.1 | 7.2 | 3.6 | 3.7 | 1.1 | 4.7 |
| Energy to Break (J) | 1.4 | 3.1 | 2.0 | 1.3 | 1.4 | 2.1 |
| Din Abrasion Index | 50.0 | 67.0 | 53.0 | 30.0 | 39.0 | 48.0 |
| Optical Properties | | | | | | |
| ChromaMeter-L | 83.0 | 81.9 | 80.6 | 83.1 | 84.9 | 84.9 |
| ChromaMeter-a* | −0.2 | −0.1 | −0.1 | −0.2 | −0.5 | −0.5 |
| ChromaMeter-b* | 6.6 | 7.5 | 6.6 | 7.2 | 6.2 | 6.4 |

TABLE 9

Formulations and Properties of Transparent Rubber Compounds in Example 7

| | U | V | W | X |
|---|---|---|---|---|
| Ingredients (phr) | | | | |
| EXXPRO ™ MDX 96-4 | 50 | 50 | 50 | 50 |
| NATSYN ™ 2200 | 50 | 50 | 50 | 50 |
| Silica, HiSil 243LD | 45 | 0 | 0 | 35 |

TABLE 9-continued

Formulations and Properties of Transparent Rubber Compounds in Example 7

|  | U | V | W | X |
|---|---|---|---|---|
| Silica, HiSil 195T | 0 | 45 | 0 | 0 |
| Silica, Zeosil 1115MP | 0 | 0 | 45 | 0 |
| Silica, Cab-O-Sil M5 | 0 | 0 | 0 | 10 |
| Si69 | 3.6 | 3.6 | 3.6 | 3.6 |
| FLEXON ™ 766 | 6 | 6 | 6 | 6 |
| Wax, Paraffin | 4 | 4 | 4 | 4 |
| PEG 3350 | 4 | 4 | 4 | 4 |
| Zinc oxide | 1 | 1 | 1 | 1 |
| Stearic acid | 1 | 1 | 1 | 1 |
| Sulfur | 0.8 | 0.8 | 0.8 | 0.8 |
| MBTS | 0.6 | 0.6 | 0.6 | 0.6 |
| TBBS | 1.2 | 1.2 | 1.2 | 1.2 |
| DPG | 0.8 | 0.8 | 0.8 | 0.8 |
| Cure Properties | | | | |
| Minimum Torque, dN.m | 1.97 | 2.8 | 1.41 | 2.18 |
| Maximum Torque, dN.m | 8.47 | 10.3 | 7.04 | 8.95 |
| Delta Torque | 6.5 | 7.49 | 5.63 | 6.78 |
| Ts2 Scorch, min | 1.26 | 1.29 | 1.33 | 1.29 |
| T50 Cure Time, min | 1.49 | 1.57 | 1.51 | 1.54 |
| T90 Cure Time, min | 2.5 | 2.29 | 2.52 | 2.41 |
| Physical Properties | | | | |
| Hardness | 49.9 | 53.5 | 47.1 | 51.1 |
| Strain at Break (%) | 582.42 | 479.04 | 576.32 | 611.96 |
| Stress at Break (MPa) | 8.44 | 8.91 | 11.11 | 10.11 |
| 20% Modulus (MPa) | 0.64 | 0.79 | 0.52 | 0.65 |
| 100% Modulus (MPa) | 1.43 | 1.84 | 1.25 | 1.45 |
| 300% Modulus (MPa) | 4.23 | 5.49 | 4.57 | 4.32 |
| Energy to Break (J) | 9.04 | 6.72 | 10.8 | 10 |
| Dispersion | 6.1 | 5.1 | 8 | 5.5 |
| DIN Abrasion Index | 90 | 99 | 105 | 95 |
| Mooney Viscosity (1 + 4 @ 100° C.) | 50.8 | 59.8 | 46.2 | 54.4 |
| Optical Properties | | | | |
| ChromaMeter L | 69.7 | 74.5 | 77.1 | 76.2 |
| ChromaMeter a* | 3.5 | 1.2 | 1.7 | 0.4 |
| ChromaMeter b* | 44.6 | 40.2 | 37.2 | 38.2 |

TABLE 10

Colorable Rubber Compound Formulation in Example 8

| Ingredient | phr |
|---|---|
| Brominated poly(isobutylene-co-p-methylstyrene) (EXXPRO ™), varying bromine, p-methylstyrene contents | 20 |
| Styrene-butadiene rubber (sSBR), varying styrene, vinyl contents | 55 |
| Polybutadiene, 98% cis | 25 |
| Precipitated silica | 75 |
| Titanium dioxide | 20 |
| Silane coupling agent (10% of silica), Si-69 | 7.5 |
| Aromatic oil, Sundex 8125 | 24 |
| Zinc oxide | 2 |
| Stearic acid | 1 |
| Antioxidant, mixed diaryl-p-phenylenediamine | 0.75 |
| Sulfur | 1.2 |
| Sulfeneamide, N-Cyclohexyl-2-benzothiazyl-sulfeneamide (CBS) | 1.75 |
| Diphenylguanidine | 1.2 |

TABLE 11

Colorable Rubber Compound Properties in Example 9

|  | A1 | B1 | C1 | D1 | E1 | F1 | G1 | H1 |
|---|---|---|---|---|---|---|---|---|
| Ingredients, phr | | | | | | | | |
| EXXPRO ™, phr | 0 | 20 | 0 | 20 | 0 | 20 | 0 | 20 |
| SSBR, phr | 75 | 55 | 75 | 55 | 75 | 55 | 75 | 55 |
| sSBR, %-styrene | 15 | 15 | 15 | 15 | 20 | 20 | 23 | 23 |
| sSBR, %-vinyl | 57 | 57 | 30 | 30 | 63 | 63 | 58 | 58 |
| Cure Properties | | | | | | | | |
| Minimum Torque, dN · m | 3.21 | 2.22 | 4.05 | 4.21 | 3.85 | 3.37 | 4.29 | 4.42 |
| Maximum Torque, dN · m | 20.27 | 18.45 | 22.95 | 23.20 | 19.50 | 20.53 | 22.10 | 21.10 |
| Ts2 Scorch, min | 2.81 | 4.22 | 2.27 | 2.91 | 2.65 | 3.90 | 2.59 | 3.33 |
| T'50 | 4.74 | 6.56 | 3.89 | 5.22 | 4.49 | 6.59 | 5.07 | 6.13 |
| T'90 | 9.99 | 12.60 | 6.91 | 9.19 | 11.53 | 13.21 | 9.66 | 12.19 |
| Physical Properties | | | | | | | | |
| Hardness | 60.30 | 57.90 | 62.10 | 64.70 | 62.70 | 64.70 | 64.90 | 63.70 |
| Elongation (%) | 335.42 | 322.16 | 349.45 | 346.48 | 299.62 | 255.32 | 299.24 | 254.22 |
| Stress at Break (MPa) | 16.48 | 13.03 | 16.68 | 15.19 | 16.09 | 12.08 | 15.05 | 12.36 |
| 20% Modulus (MPa) | 0.96 | 0.84 | 1.00 | 1.08 | 0.92 | 1.07 | 1.01 | 1.04 |
| 100% Modulus (MPa) | 2.47 | 2.36 | 2.49 | 2.81 | 2.75 | 3.22 | 2.94 | 3.20 |
| 300% Modulus (MPa) | 13.92 | 11.59 | 13.26 | 12.5 | — | — | — | — |
| Energy to Break (J) | 5.90 | 4.91 | 6.44 | 6.59 | 6.31 | 3.98 | 6.06 | 3.78 |
| Dispersion Rating | 8.6 | 7.4 | 8.8 | 7.5 | 7.9 | 7.8 | 8.1 | 7.7 |
| Din Abrasion Index | 125 | 119 | 141 | 112 | 114 | 90 | 109 | 97 |
| Dynamic Properties | | | | | | | | |
| G" @ 0° C. (MPa) | 0.4486 | 0.2743 | 0.4462 | 0.6187 | 0.4802 | 0.6098 | 0.7162 | 0.5347 |
| Tangent delta @ 0° C. | 0.1715 | 0.1594 | 0.1626 | 0.1969 | 0.1878 | 0.2314 | 0.2126 | 0.2095 |
| G* @ 60° C. (MPa) | 1.9111 | 1.2963 | 2.0522 | 2.1211 | 1.7042 | 1.9006 | 2.1562 | 1.7225 |
| Tangent delta @ 60° C. | 0.1153 | 0.0995 | 0.1096 | 0.1085 | 0.0942 | 0.0985 | 0.1374 | 0.1071 |

TABLE 12

Formulations and Properties of Test Compositions I1 and J1 in Example 10.

| | I1 | J1 |
|---|---|---|
| Ingredient (phr) | | |
| EXXPRO ™ 89-1 | 50.0 | 50.0 |
| NATSYN ™ 2200 | 25.0 | 25.0 |
| BR 1207 | 25.0 | 25.0 |
| Silica, Ultrasil VN3 | 25.0 | 25.0 |
| Silica, Cab-O-Sil M5 | 10.0 | 10.0 |
| Si69 | 3.5 | 3.5 |
| Wax, Paraffin | 2.0 | 2.0 |
| FLEXON ™ 766 | 6.0 | 6.0 |
| Zinc oxide | 1.0 | 3.0 |
| Stearic acid | 1.0 | 1.5 |
| Sulfur | 0.6 | 0.0 |
| MBTS | 0.3 | 0.0 |
| TBBS | 1.2 | 0.0 |
| DPG | 0.8 | 0.0 |
| Peroxide, Varox 231 XL | 0.0 | 3.0 |
| Cure and Physical Properties | | |
| MV: ML(1 + 4) @ 100° C. | 60.6 | 63.6 |
| Minimum Torque, dN · m | 2.0 | 2.4 |
| Maximum Torque, dN · m | 8.6 | 6.1 |
| Ts2 (min) | 2.5 | 1.6 |
| T50 (min) | 2.9 | 1.3 |
| T90 (min) | 6.1 | 17.8 |
| Hardness | 48.7 | 44.3 |
| % Elongation at Break | 486.0 | 480.8 |
| Tensile Strength (MPa) | 6.9 | 2.8 |
| 20% Modulus (MPa) | 0.6 | 0.4 |
| 100% Modulus (MPa) | 1.4 | 0.9 |
| 300% Modulus (MPa) | 4.2 | 2.1 |
| Energy to Break (J) | 5.3 | 3.0 |
| Din Abrasion index | 106 | 82 |
| Optical Properties | | |
| ChromaMeter-L | 74.0 | 85.7 |
| ChromaMeter-a* | 1.6 | −1.3 |
| ChromaMeter-b* | 41.8 | 21.1 |

TABLE 13

Formulations and Properties of Test Compositions K1 and L1 in Example 11.

| | K1 | L1 |
|---|---|---|
| Ingredient (phr) | | |
| EXXPRO ™ 89-1 | 50.0 | 50.0 |
| BR 1207 | 25.0 | 25.0 |
| NATSYN ™ 2200 | 25.0 | 25.0 |
| Silica, Rhodia Zeosil 45 | 25.0 | 35.0 |
| Silica, Aerosil 200 | 10.0 | 0.0 |
| PARAPOL ™ 950 | 10.0 | 10.0 |
| DPG | 1.8 | 1.8 |
| Zinc Stearate | 5.0 | 5.0 |
| Trigonox 29 | 1.0 | 2.0 |
| Thiate U | 1.0 | 1.0 |
| Cure and Physical Properties | | |
| MV: ML(1 + 4) @ 100° C. | 110.3 | 107.5 |
| Minimum Torque dN · m | 2.5 | 2.6 |
| Maximum Torque dN · m | 11.4 | 12.3 |
| Ts2 (min) | 0.4 | 0.4 |
| T50 (min) | 0.6 | 0.6 |
| T90 (min) | 4.3 | 2.8 |
| Hardness | 47.9 | 48.9 |
| % Elongation at Break | 519.0 | 415.0 |
| Tensile Strength (MPa) | 9.7 | 7.6 |
| 20% Modulus (MPa) | 0.6 | 0.7 |
| 100% Modulus (MPa) | 1.8 | 1.9 |
| 300% Modulus (MPa) | 4.7 | 5.1 |
| Energy to Break (J) | 8.0 | 5.4 |
| Din Abrasion Index | 89.0 | 82.0 |
| Optical Properties | | |
| ChromaMeter-L | 83.7 | 83.7 |
| ChromaMeter-a* | −2.7 | −2.9 |
| ChromaMeter-b* | 14.0 | 14.6 |

TABLE 14

Formulations of Test Compositions M1-P1 in Example 12.

| Ingredient, phr | M1 | N1 | O1 | P1 |
|---|---|---|---|---|
| EXXPRO ™ 89-1 | 30 | 40 | 50 | 30 |
| BR 1207 | 70 | 60 | 50 | 70 |
| Silica, PPG HiSil 195G | 35 | 35 | 35 | 35 |
| Silane Coupler, Si69 | 2.52 | 2.16 | 1.8 | 2.52 |
| Silica, Aerosil 200 | 10 | 10 | 10 | 10 |
| PARAPOL ™ 950 | 10 | 10 | 10 | 0 |
| PARAPOL ™ 2500 | 0 | 0 | 0 | 10 |
| Zinc Stearate | 5 | 5 | 5 | 5 |
| Trigonox ™ 29 | 1 | 0.9 | 0.8 | 1 |
| Thiate U | 0.8 | 0.9 | 1 | 0.8 |

TABLE 15A

Properties of Test Compositions M1-P1 in Example 12

| | M1 | N1 | O1 | P1 |
|---|---|---|---|---|
| Processing | | | | |
| MV: ML(1 + 4) @ 100° C. | 85.3 | 82.9 | 87.7 | 92.6 |
| MS @ 135° C. −5 pt | 3.3 | 3.06 | 2.39 | 3.39 |
| MS @ 135° C. −10 pt | 3.89 | 3.6 | 2.77 | 3.96 |
| Cure: MDR @ 150° C., ½° ARC | | | | |
| ML, dN · m | 3.81 | 3.89 | 4.34 | 4.11 |
| MH, dN · m | 15.37 | 15.1 | 15.92 | 17.32 |
| MH-ML | 11.55 | 11.21 | 11.57 | 13.21 |
| Ts2 (min) | 0.87 | 0.94 | 0.91 | 0.74 |
| T25 (min) | 1.14 | 1.2 | 1.2 | 1.07 |
| T50 (min) | 2.38 | 2.54 | 2.45 | 2.25 |
| T75 (min) | 5.55 | 5.63 | 4.99 | 4.94 |
| T90 (min) | 14.56 | 14.0 | 12.34 | 12.2 |
| T95 (min) | 20.57 | 20.24 | 19.05 | 18.34 |
| RATE | 3.7 | 3.6 | 3.7 | 4.4 |
| Physical Properties | | | | |
| 20% Modulus (MPa) | 1.04 | 1.02 | 1.19 | 1.17 |
| 100% Modulus (MPa) | 2.75 | 2.98 | 3.68 | 3.05 |
| 200% Modulus (MPa) | 5.45 | 5.81 | 6.87 | 6.18 |
| 300% Modulus (MPa) | 9.05 | 9.51 | 0 | 10.2 |
| Tensile, MPa | 13.13 | 11.38 | 10.48 | 15.09 |
| Elongation, % | 399 | 345 | 292 | 413 |
| Energy to Break (J) | 8.14 | 6.16 | 5.08 | 9.49 |
| Shore A @ 23° C. | 57.7 | 56.5 | 60.1 | 61.1 |
| Din Abrasion | 300 | 254 | 192 | 302 |
| Dispersion | 7.4 | 5.7 | 4.8 | 8 |
| Optical Properties | | | | |
| ChromaMeter-L | 85.27 | 84.79 | 83.42 | 85.76 |
| ChromaMeter-a* | −2.84 | −2.98 | −2.87 | −3.31 |
| ChromaMeter-b* | 20 | 21.06 | 24.45 | 17.6 |

TABLE 15B

Properties of Test Compositions M1-P1 in Example 12

| Dynamic Properties | M1 | N1 | O1 | P1 |
|---|---|---|---|---|
| Temp: −60° C. | | | | |
| G', MPa | 323 | 327 | 370 | 271 |
| G", MPa | 107 | 124 | 155 | 98.9 |
| G*, MPa | 340 | 350 | 401 | 288 |
| Tan-delta | 0.3298 | 0.3783 | 0.4180 | 0.3650 |
| Temp: −30° C. | | | | |
| G', MPa | 40.1 | 32.8 | 29.5 | 40.1 |
| G", MPa | 12.9 | 13.7 | 13.9 | 12.3 |
| G*, MPa | 42.2 | 35.6 | 32.6 | 42.0 |
| Tan-delta | 0.3217 | 0.4180 | 0.4705 | 0.3071 |
| Temp: 0° C. | | | | |
| G', MPa | 5.38 | 4.81 | 6.24 | 6.39 |
| G", MPa | 0.692 | 0.671 | 0.880 | 0.834 |
| G*, MPa | 5.43 | 4.86 | 6.30 | 6.44 |
| Tan-delta | 0.1285 | 0.1396 | 0.1411 | 0.1305 |
| Temp: 30° C. | | | | |
| G', MPa | 5.82 | 5.09 | 6.05 | 6.39 |
| G", MPa | 0.324 | 0.262 | 0.293 | 0.404 |
| G*, MPa | 5.83 | 5.10 | 6.05 | 6.40 |
| Tan-delta | 0.0557 | 0.0515 | 0.0485 | 0.0632 |
| Temp: 60° C. | | | | |
| G', MPa | 6.22 | 5.40 | 6.07 | 6.46 |
| G", MPa | 0.205 | 0.178 | 0.193 | 0.265 |
| G*, MPa | 6.22 | 5.40 | 6.07 | 6.46 |
| Tan-delta | 0.0330 | 0.0330 | 0.0318 | 0.0410 |

We claim:

1. A reinforced, colorable elastomeric composition having utility as a tire sidewall or shoe sole, consisting essentially of at least one random copolymer of a $C_4$ to $C_7$ isoolefin and p-methylstyrene derived units, reinforced with from 30 to 80 phr of at least one non-black filler; a cure system, and polybutene processing oil having a number average molecular weight of at least 400.

2. The composition of claim 1, the cure system comprising an accelerating agent selected from the group consisting of stearic acid, tetramethylthiuram disulfide, 4,4'-dithiodimorpholine, tetrabutylthiuram disulfide, benzothiazyl disulfide, hexamethylene-1,6-bisthiosulfate disodium salt dihydrate, 2-(morpholinothio) benzothiazole, N-oxydiethylene thiocarbamyl-N-oxydiethylene sulfonamide, zinc 2-ethyl hexanoate, and N,N'-diethyl thiourea.

3. The composition of claim 2, wherein the accelerating agent is N,N'-diethyl thiourea.

4. The composition of claim 1, wherein the non-black filler is selected from the group consisting of silicas, clays, talcs, calcium carbonates, aluminum oxides, titanium oxides, and zinc oxides, and mixtures thereof.

5. The composition of claim 1, wherein the composition does not contain carbon black filler.

6. The composition of claim 1, wherein the cure system comprises a compound selected from the group consisting of ZnO, CaO, MgO, $Al_2O_3$, $CrO_3$, FeO, $Fe_2O_3$, NiO, $Zn(Stearate)_2$, $Ca(Stearate)_2$, $Mg(Stearate)_2$, and $Al(Stearate)_3$.

7. The composition of claim 1, wherein the cure system further comprises an alkylperoxide.

8. The composition of claim 1, wherein the processing oil has a number average molecular weight of from 400 to 10,000.

9. The composition of claim 1, wherein the number average molecular weight of the polybutene polymer is not greater than 10,000.

10. The composition of claim 1, wherein the polybutene is present in the composition in an amount from 2 to 30 phr.

11. A colorable tire sidewall comprising the composition of claim 1.

12. A shoe sole comprising the composition of claim 1.

13. A reinforced, colorable elastomeric composition having utility as a tire sidewall or shoe sole, consisting essentially of at least one random copolymer of a $C_4$ to $C_7$ isoolefin and p-methylstyrene derived units reinforced with from 30 to 80 phr of at least one non-black filler; a cure system, and polybutene processing oil having a viscosity of from 10 to 6000 cSt at 100° C.

14. The composition of claim 13, of the cure system comprising an accelerating agent selected from the group consisting of stearic acid, tetramethylthiuram disulfide, 4,4'-dithiodimorpholine, tetrabutylthiuram disulfide, benzothiazyl disulfide, hexamethylene-1,6-bisthiosulfate disodium salt dihydrate, 2-(morpholinothio) benzothiazole, N-oxydiethylene thiocarbamyl-N-oxydiethylene sulfonamide, zinc 2-ethyl hexanoate, and N,N'-diethyl thiourea.

15. The composition or claim 14, wherein the accelerating agent is N,N'-diethyl thiourea.

16. The composition of claim 13, wherein the copolymer is present in an amount of from 20 to 50 phr.

17. The composition of claim 13, wherein the non-black filler is selected from the group consisting of silicas, clays, talcs, calcium carbonates, aluminum oxides, titanium oxides, and zinc oxides, and mixtures thereof.

18. The composition of claim 13, the composition does not contain carbon black filler.

19. The composition of claim 13, wherein the cure system includes a compound selected from the group consisting of ZnO, CaO, MgO, $Al_2O_3$, $CrO_3$, FeO, $Fe_2O_3$, NiO, $Zn(Stearate)_2$, $Ca(Stearate)_2$, $Mg(Stearate)_2$, and $Al(Stearate)_3$.

20. The composition of claim 13, wherein the cure system further comprises an alkylperoxide.

21. The composition of claim 13, wherein the processing oil has a number average molecular weight of from 400 to 10,000.

22. The composition of claim 13, wherein the number average molecular weight of the polybutene polymer is less than 10,000.

23. The composition of claim 13, wherein the polybutene is present in the composition in an amount from 2 to 30 phr.

24. The composition of claim 1, wherein the composition does not contain carbon black filler and the composition has a lightness value in the range of 80.6 to 85.76 as determined using a Minolta CR-100 ChromaMeter.

25. The composition of claim 1, wherein naphthenic oil is substantially absent.

26. The composition of claim 13, wherein the composition does not contain carbon black filler and the composition has a lightness value in the range of 80.6 to 85.76 as determined using a Minolta CR-100 ChromaMeter.

27. The composition of claim 13, wherein naphthenic oil is substantially absent.

* * * * *